Feb. 17, 1942.　　　H. M. DODGE　　　2,273,182
SEALING STRIP
Filed Jan. 17, 1939　　　2 Sheets-Sheet 1

INVENTOR
HOWARD M. DODGE
BY Evans & McCoy
ATTORNEYS

Feb. 17, 1942. H. M. DODGE 2,273,182
SEALING STRIP
Filed Jan. 17, 1939 2 Sheets-Sheet 2
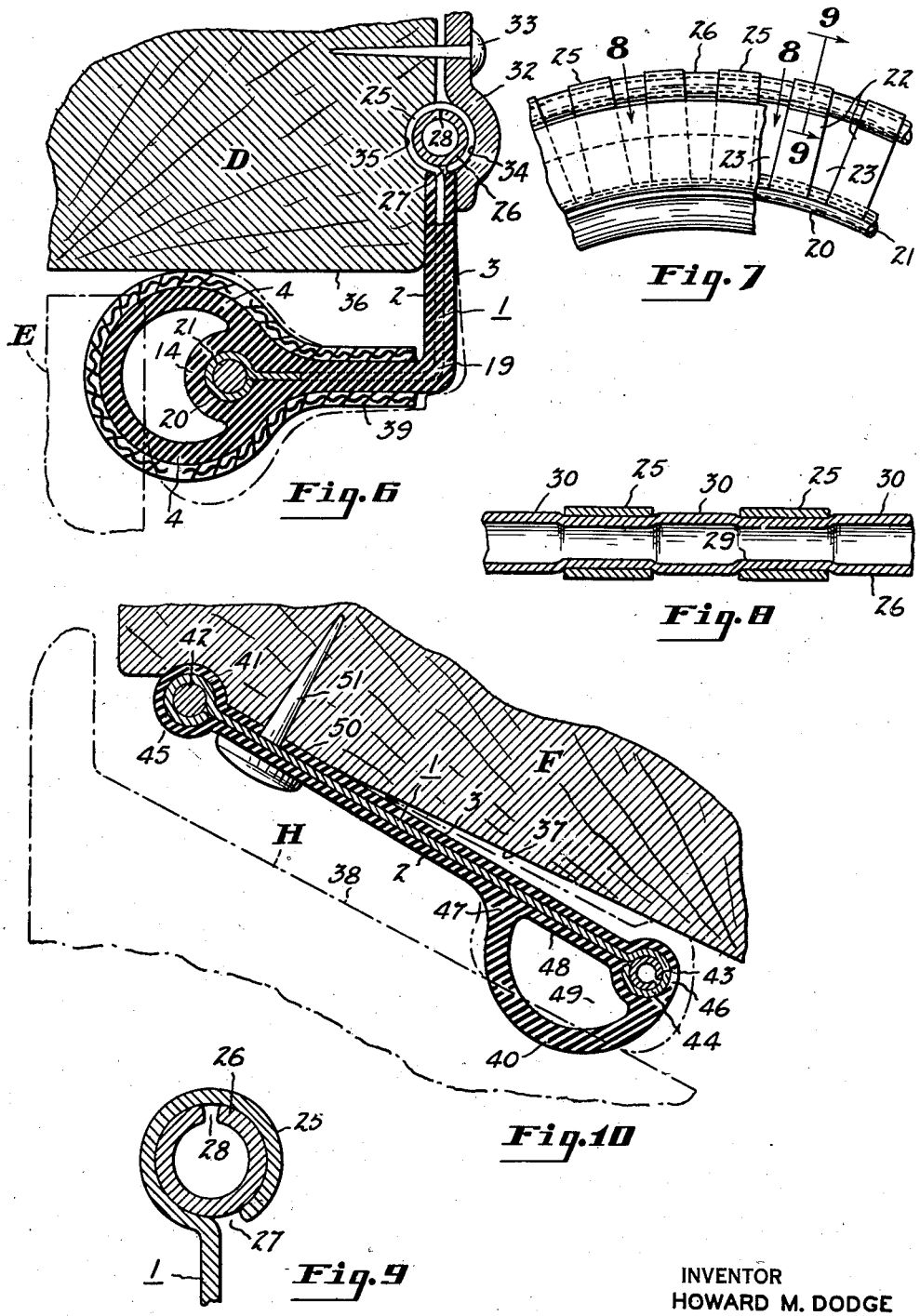
INVENTOR
HOWARD M. DODGE
BY
ATTORNEYS Patented Feb. 17, 1942

2,273,182

UNITED STATES PATENT OFFICE 2,273,182

SEALING STRIP

Howard M. Dodge, Wabash, Ind., assignor to The General Tire & Rubber Company, Akron, Ohio, a corporation of Ohio Application January 17, 1939, Serial No. 251,397

10 Claims. (Cl. 20—69)

This invention relates to sealing strips such as are used with windows and doors, and more particularly to sealing strips or door lacings, as they are commonly known, which are formed of rubber and are reinforced by relatively thin sheet metal cores.

Metal reinforced sealing strips have been in common use on automobile bodies and refrigerator doors. It is frequently necessary to bend the sealing strip around a curved outline in order that the strip may follow the contour of the door or window to be sealed thereby. In some instances the sealing strip is produced by an independent manufacturer and sold to the automobile manufacturer, the latter having the sealing strip installed in the automobile bodies by its own employees. Where the sealing strip is to follow a curved outline it is customary in some instances for the manufacturer of the sealing strip to preform the same to the desired curve or contour and ship it to the automobile manufacturer with such curve or contour permanently retained therein. A sealing strip of this character is commonly referred to as contour tape and it is desirable that such tape retain the desired curvature during shipment and handling so that it accurately fits the window or door opening for which it is intended.

It is, therefore, an object of the invention to provide stripping or tape of the character mentioned which is laterally deformable and is capable of retaining a predetermined contour imparted thereto.

Another object is to provide a sealing strip which is adapted to effect a seal by the combined or cooperative action of a deformable cushion portion and a resilient spring metal core.

Sealing strips combining a tubular rubber cushion with a metal reinforcing or attaching element are well known. However, it frequently occurs that because of the relatively fragile or weak construction of the rubber tube, the latter becomes torn or broken away from the metal core. Another object of the invention is, therefore, to provide a tubular rubber sealing strip having a sheet metal reinforcement in which the metal is so arranged as to resist excessive deformation of the tubular portion and serves to minimize the possibility of the tubular portion being torn or separated from the metal.

Another object is to provide a sealing strip of attractive appearance which is simple in design and construction and relatively inexpensive to manufacture. Other objects and advantages will become apparent from the following detailed description of suitable embodiments of the invention illustrated in the accompanying drawings, in which:

Fig. 6 is an enlarged sectional view illustrating a modified form of sealing strip and showing the same attached to a door frame;

Fig. 7 is a fragmentary detail, with parts removed, showing the sealing strip of Fig. 6 bent or deformed laterally;

Fig. 8 is a fragmentary detail, in section, taken substantially on the line 8—8 of Fig. 7 and enlarged with respect thereto;

Fig. 9 is a fragmentary sectional detail taken substantially on the line 9—9 of Fig. 7 and enlarged with respect thereto; and Fig. 10 is an enlarged sectional view illustrating a modified form of sealing strip embodying the invention and showing the same attached to a door frame.

Figure 1:
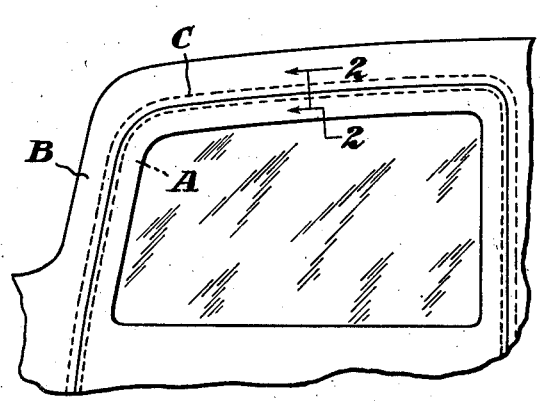
Figure 1 is a diagrammatic elevational view of a portion of an automobile body, showing a sealing strip of the character contemplated by the present invention in place around a door thereof.

Referring to the drawings by numerals of reference which indicate like parts throughout the several views, Figure 1 shows a sealing strip A attached to door frame B of an automobile body and arranged to be engaged by the edge of door C so as to effect a weather seal of the crevice or opening between the door and door frame.

Figure 4:
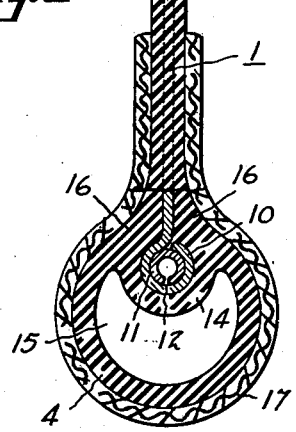
Fig. 4 is an enlarged sectional view taken substantially on the line 4—4 of Fig. 3.

The body portion of the sealing strip is formed of a suitable rubber composition which is sufficiently soft and flexible to permit repeated deformation without cracking or excessive deterioration. A preferred method of making the strip is by means of an extrusion process wherein the uncured rubber composition is forced under pressure through a suitable die, formed to the desired cross-sectional configuration of the strip, so that the latter emerges from the die in substantially its final shape. Embedded in the rubber of the sealing strip is a sheet metal reinforcement indicated generally by the numeral 1, which may be passed through the die in synchronism with the rubber composition so that the metal strip and rubber emerge from the die opening continuously and simultaneously with one another and with the rubber substantially embracing the metal, as shown in Fig. 4. Side portions 2 and 3 of the rubber body are disposed on opposite sides of the metal strip and extend across substantially the entire width of the latter. Along one edge of the sealing strip the rubber body is formed with an integral longitudinally continuous tubular cushion 4 which is distorted upon being engaged by a door or the like to effect a seal with the same.

The metal reinforcing strip 1 is of spring-like or resilient character and has a succession of substantially parallel slots 5 which extend across substantially its entire width. These slots are open through one edge of the strip, thus providing a series of tabs or bars 6 which are disposed laterally across the width of the strip. The marginal edge of the metal strip opposite that through which the slots 5 open is rolled into a continuous bead 7 which embraces a longitudinally extending reinforcement such as a steel wire 8. Each of the tabs or bars 6 has its free end rolled into a relatively short bead 10 which may be of about the same diameter as the bead 7.

Extending longitudinally throughout substantially the entire length of the strip 1 and disposed within the short beads 10 is a deformable member such as a collapsible tube 11, which may be formed of soft metal. This tube may be circular or seamless in cross section but preferably is of substantially a C section as shown in Fig. 4 and is provided with a longitudinally extending split or crack 12 between opposed edges of the metal forming the tube.

As shown in Fig. 4, the side portions 2 and 3 of the rubber body of the strip extend as far as the bead 7, the latter being exposed throughout the length of the strip. Between adjacent tabs 6 the rubber of the body extends through the slots 5 so that the side 2 is integral with the side 3 and in effect the tabs are individually embedded in the rubber body of the strip. The edge of the reinforced strip 1, along which the beads 10 are formed, is embedded in a portion 14 of the rubber body which is disposed in crescent shaped chamber 15 of the tubular cushion 4. The strip is provided with relatively thick shoulder portions 16 to which the tubular cushion 4 is attached. These shoulders are spaced inwardly from the edge of the reinforcing metal strip so that upon collapse of the tubular cushion the walls of the latter are engaged by the thick portion 14 of the rubber body which embraces the beaded edge of the reinforcing strip.

Figure 5:
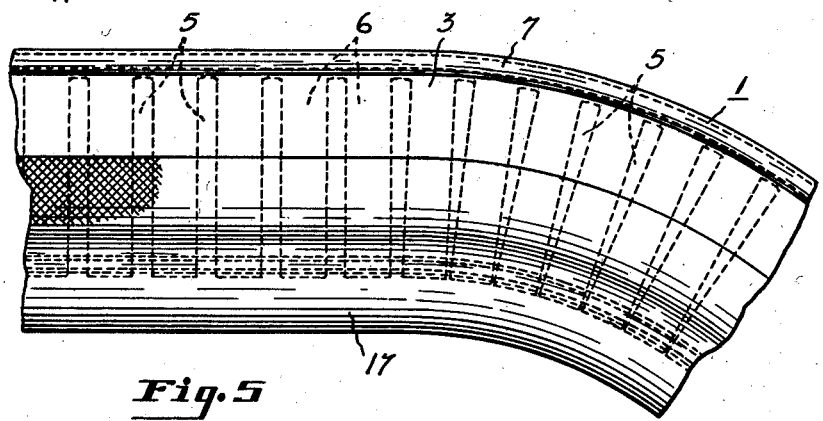
Fig. 5 is an enlarged fragmentary elevational view, with parts removed, showing the sealing strip with a portion thereof bent or deformed laterally.

Upon bending the sealing strip laterally in the plane of the reinforcing metal 1, the short beads 10 slide over the collapsible tube 11 away from or toward one another, as shown in Fig. 5. Such deformation of the strip stretches or compresses the rubber body, particularly in the region of the tubular cushion 4. In order to retain the sealing strip in deformed shape, pressure may be applied on opposite sides of the beads 10 so as to partially collapse the same into frictional engagement with the collapsible metal tube 11.

If desired, the surface of the sealing strip may be covered partially or entirely by a suitable cloth tape 17. This tape may be applied substantially immediately after the extrusion of the sealing strip or may be applied after the latter has been shaped to any desired contour. After the sealing strip has been extruded it is cured in any suitable manner, such as by heating in an autoclave.

Figure 2:
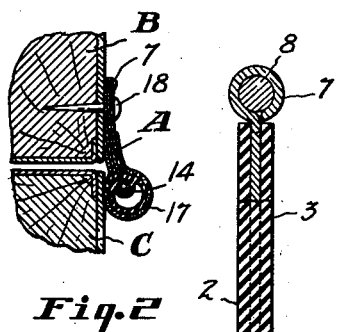
Fig. 2 is a fragmentary detail in section taken substantially on the line 2—2 of Fig. 1.
Figure 3:
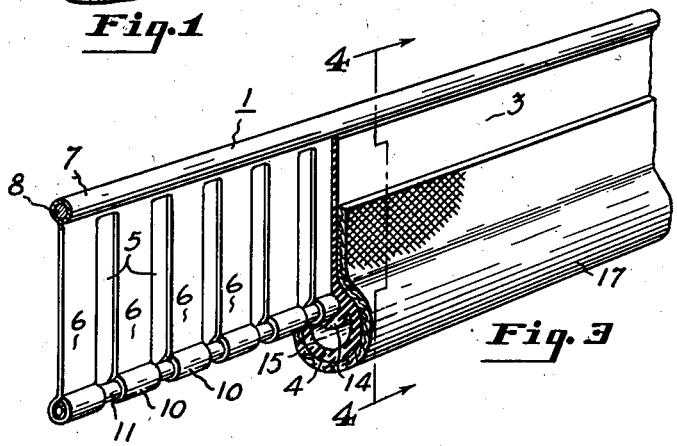
Fig. 3 is an enlarged perspective view, partly in section and with parts removed, showing the construction of the sealing strip.

In attaching the sealing strip to the door frame B, any suitable means such as tacks 18 may be used. These tacks pass through the slots 5 so that the heads of the tacks can partially overlie the tabs 6, thus securing the strip firmly in place. Upon closing of the door the reinforcing strip 1 is partially deflected, as shown in Fig. 2, so that its inherent resiliency, tending to return it to its normal shape, assists the tubular cushion 4 in maintaining a seal between the door and door frame.

In Fig. 6 is illustrated a sealing strip wherein the metal reinforcing member 1 is bent longitudinally throughout its length at 19 so as to form a right angle in the relatively flat body portion of the sealing strip. This bend may be located at any suitable position between the beads of the reinforcing strip, preferably about midway as shown. The metal reinforcing strip is formed with a continuous bead 20 along one edge which embraces a longitudinally extending wire 21, corresponding respectively to the bead 7 and wire 8 previously described. In this modification, however, the continuous bead 20 is embedded in the portion 14 of the rubber body disposed within the tubular cushion 4.

A series of tabs or bars 22 are formed along the metal reinforcing strip and are spaced from one another by slots 23. The free ends of the tabs 22 project beyond the edge of the sides 2 and 3 of the rubber body and are formed into aligned beads 25. A longitudinally extending deformable member such as a collapsible metal tube 26 is received in the beads 25 and initially has a sliding fit therein. In forming the beads 25 the latter are preferably rolled over the collapsible tube 26, the latter having been previously formed. Other methods of manufacture are contemplated, however, such for example, as forming the beads 25 and then sliding the tube 26 longitudinally therethrough. As shown in Fig. 9, the beads 25 are not completely closed and the tip ends of the tabs 22, which are rolled to make the beads, are separated from the body portions of the tabs by spaces 27, Fig. 9. Longitudinal split 28 is also provided in the collapsible tube 26, corresponding to the split 12 previously mentioned.

In bending the sealing strip shown in Fig. 6 to conform to various door openings or configurations, the beads 25 slide longitudinally on the collapsible tube 26. For example, in Fig. 7 is shown the positions which may be taken by a number of the tabs 22 when the sealing strip is bent on a radius with the angle or bent portion 19 on the inside. When it is desired that the sealing strip retain a particular configuration, the longitudinal edge thereof formed by the beads 25 and tube 26 is clinched or "set" by passing the same through a suitable mechanism for squeezing the beads 25 about the collapsible tube 26. This operation deforms the collapsible tube locally in the regions where it is embraced by the beads 25, so that a series of spaced depressed portions 29 are formed in the collapsible tube and receive the beads 25, the latter being prevented from endwise movement on the collapsible tube by the intervening portions 30. The clinching of the beads 25 on the collapsible tube effects a substantial closing of the space 27 as shown in Fig. 6, and the split 28 may be entirely closed at least in the region of the depressed portions 29. Thus when the beads 25 are "set" the deformable member or tube 26 has a series of depressed portions which alternate with a series of larger portions to lock the embracing beads in predetermined positions.

The sealing strip is secured to door frame D by means of a holding strip 32 which is attached by means such as nails 33 to the door frame. The beads 25 and the tube 26 are received in a socket defined by a curved surface 34 on the inside of the strip 32 and a groove 35 formed in the door frame D. In mounting the sealing strip the latter is arranged so that bend 19 thereof extends beyond inner surface 36 of the door frame so that in its normal position portion 39 of the sealing strip, between the cushion 4 and the bend 19, is spaced from the door frame and the tubular cushion contacts the surface 36. Upon closing of door E the latter engages the cushion 4 directly opposite the body portion 14 and in line with the plane of the portion 39 of the strip, thus deforming the cushion to substantially the broken line position illustrated in Fig. 6. The pressure applied to the sealing strip by the door E not only deforms the tubular cushion 4 but also the metal reinforcement I so that the latter is displaced in the direction of door movement. The deformation of the cushion portion 4 forces one side thereof into engagement with surface 36 of the door frame, thus insuring a tight seal between the door and the door frame.

Fig. 10 illustrates a modification of the invention wherein the sealing strip is disposed between beveled faces 37 and 38 of door frame F and door H, respectively. The metal reinforcing strip I is completely embedded or enveloped in the rubber body of the sealing strip and along one marginal edge of the latter is formed a semi-cylindrical tubular cushion portion 40. A longitudinally extending bead 41 is rolled along one edge of the reinforcing strip and receives a continuous wire 42. Along the opposite edge of the reinforcing strip extends a deformable member or tube 43 embraced by a series of relatively short beads 44 formed on the ends of tabs or bars which correspond to the tabs 6 and 22 previously described. The beads 41 and 44 are embedded in marginal portions 45 and 46, respectively, of the rubber body. The semi-cylindrical cushion 40 is disposed wholly on one side of the metal reinforcing strip and is integrally joined to the marginal portion 46 of the body which embraces the beads 44 and at 47 to the side portion 2 intermediate the beads of the metal reinforcing strip. Thus a portion 48 of the side 2 of the rubber body defines one wall of chamber 49 of the tubular cushion 40.

The sealing strip is secured by means such as nails 51 against a surface portion 50 of the door frame F, which is set at an angle to the face 37. Thus the marginal portion 46 of the sealing strip is normally disposed in spaced relation to the face 37 of the door frame. Upon moving of the door to closed position the cushion 40 is deformed as indicated by the broken lines and the marginal portion 46 forced into abutting engagement with the face 37 of the door frame. In this manner the seal is maintained by the deformation of the rubber cushion 40 in combination with the distortion or bending of the metal reinforcing strip I. When the door is opened the sealing strip springs back to its normal position, indicated by the full lines, through the inherent resiliency of the spring metal of which the reinforcing strip is formed and the resiliency of the rubber of the cushion 40.

Other modes of utilizing the principles of the present invention may be resorted to, change being made with regard to details of construction and assembly, numerous modifications, substitutions of parts, and changes in procedure being contemplated.

What I claim is:

1. A door strip comprising a metal core strip having a relatively thin body portion and reversely bent marginal edges to form longitudinally extending, substantially parallel beads, a casing of resilient rubber composition embracing one bead and the body portion of the core strip, and a tubular rubber cushion formed integrally with the casing and disposed substantially wholly on one side of the core strip and at one edge of the latter.

2. A door sealing strip comprising a relatively thin spring metal core strip having rolled edges to form a pair of longitudinally extending, substantially parallel beads, a resilient rubber casing substantially enclosing the core and both beads, and a tubular cushion of rubber composition formed substantially wholly on one side of the core strip and integral with the casing, said cushion having one side joined to the casing along a portion of the latter overlying one of the beads and another side joined to the casing along a portion of the latter spaced from and paralleling the beads.

3. A sealing strip comprising a sheet metal core having reversely bent edges forming longitudinal parallel beads and transverse slits extending through one of the beads to make the same discontinuous, a rubber body embedding the major part of the core including the discontinuous bead, and a tubular rubber cushion disposed about the embedded bead and having an air chamber extending approximately 180° around said bead and separated therefrom by the rubber of the body.

4. A bendable core for window or door stripping comprising a metal strip having one marginal edge portion continuous and a series of spaced tongues extending laterally from said portion, the ends of said tongues being bent reversely to form a succession of discontinuous aligned beads, and a hollow collapsible member extending longitudinally through the beads, said member being embraced by the beads and locally and permanently deformable upon collapse of the beads thereagainst whereby the collapsed beads embrace the deformed member to prevent longitudinal movement of the beads relative to the member.

5. A bendable core for window or door stripping comprising a metal strip having one marginal edge portion continuous and a series of spaced tongues extending laterally from said portion, the ends of said tongues being bent reversely to form spaced aligned tubular beads and a substantially tubular metal member extending longitudinally through the beads and embraced thereby at spaced regions, said tubular member having relatively little resistance to crushing and locally and permanently deformable upon collapse of the embraced beads thereagainst whereby the collapsed beads embrace the deformed tube at said permanently deformed portions to effect an interlocking of the beads and the tube to thereby prevent longitudinal movement of the tube relative to the beads.

6. A door strip comprising a metal core strip having a relatively thin body portion and reversely bent marginal edges to form longitudinally extending substantially parallel beads, a casing of resilient rubber composition embracing one bead and the body portion of the core strip, and a tubular rubber cushion formed integrally with the casing and having a crescent shaped air chamber disposed about the embraced bead.

7. A door strip comprising a core formed of a sheet metal strip having one marginal edge portion continuous and bent reversely to form an edge bead, a series of spaced tongues extending laterally from said portion, the end portions of said tongues being bent reversely to form a discontinuous bead, a casing of resilient rubber composition embracing the core strips and one of the beads, and a tubular rubber cushion formed integrally with the casing and having a crescent shaped air chamber disposed about the embraced bead.

8. A door strip comprising a metal core strip having a relatively thin body portion and reversely bent marginal edges to form longitudinally extending, substantially parallel beads, said body portion having a substantially right angle bend formed therein and extending longitudinally of the strip in substantially parallel relation to the beads, a casing of resilient rubber composition embracing one bead and the body portion of the core strip, and a tubular rubber cushion formed integrally with the casing and having a crescent shaped air chamber disposed about the embraced bead.

9. A core for a sealing strip comprising a flat metal strip having a succession of transverse slits extending through one edge and forming a series of tabs, said tabs having reversely bent ends forming a discontinuous tubular bead along said edge, and a collapsible tubular member extending through said bent ends and embraced by the latter, said core being laterally bendable to slide the tab ends over said member, and the member and tab ends being clinchable together to collapse the member and thereby secure the core in bent position.

10. A sealing strip comprising a flat metal core having substantially parallel edge beads and perforations between the beads, a rubber body on both sides of the core and extending through the perforations to interlock the body and the core, said body including integral edge portions overlying the beads and providing enlarged margins on the strip, and a rubber cushion integral with the rubber body, said cushion having one line of connection with the body along one of the margins and another line of connection with the body between the margin and in the region of said interlock whereby the interlock resists stripping of the body from the core by said cushion.

HOWARD M. DODGE.